3,507,840
METHOD OF REMOVING WATER FROM WATER-SOLUBLE POLYMERS
John R. Hurlock, Oak Lawn, Ill., assignor to Nalco Chemical Company, a corporation of Delaware
No Drawing. Continuation-in-part of application Ser. No. 556,581, June 10, 1966. This application Apr. 27, 1967, Ser. No. 634,080
Int. Cl. C08f 1/88
U.S. Cl. 260—80     5 Claims

ABSTRACT OF THE DISCLOSURE

An improved method for removing water from an aqueous solution containing a water soluble polymer without experiencing loss of polymer activity. The process is accomplished by the addition of certain metal salts to a water soluble polymer system of two liquid phases comprising water and an organic water-insoluble heat transfer medium.

---

This application is a continuation-in-part of my co-pending application Ser. No. 556,581, filed June 10, 1966, and now abandoned.

Polymers of water-soluble monomers have become more and more important with the development of modern technology. Use of water-soluble polymers is widespread in paper, sewage coagulation, textiles and a myriad of other industries. In view of the great utility of water-soluble polymers, considerable effort has been expended in developing suitable methods for preparing these polymers. Among the most successful methods for polymerizing water-soluble monomers to yield water-soluble polymers are those methods which employ a two-phase system comprising an organic heat transfer medium and water as a polymerization medium. For example, British Patent 841,127 discloses a method for polymerizing water-soluble monomers by means of an inverse emulsion. Also, U.S. application Ser. No. 132,562 discloses a method for polymerizing water-soluble monomers wherein this two-phase system is employed to achieve high molecular weight products. U.S. Patent 2,982,749 teaches the use of a water-oil two-phase system for polymerizing a wide variety of water-soluble monomers. There are a number of other polymerization methods using these two components to suspend or emulsify the monomers or in some manner assist in the polymerization of the monomers.

While each of the various methods are different with respect to the method of polymerization, one common feature has been noticed. In each of these methods, the resultant polymer formed by the polymerization method is present in a system which also contains the water-insoluble heat transfer medium and water. Considerable effort has been expended to process this mixture of polymer and two liquid phases most efficiently in order to obtain the most useful product possible. One such method employs the use of methanol or other precipitating agents to separate the polymer from the two liquid phases. Polymer is then withdrawn, washed with additional methanol and dried.

However, the above method has been found to possess certain drawbacks which have limited the acceptance of that process in commercial applications. First of all, the amount of methanol necessary to separate the polymer from the two liquid phases is sufficiently large to require excessive reactor size which increases capital costs to a great extent. Furthermore, the physical handling or pumping of polymer, methanol and the various organic heat transfer mediums and water requires a number of operative steps which decreases the number of batches per day which can be produced.

To overcome the deficiencies of the methanol precipitation method for separating polymers from the two liquid phases, the industry has resorted to azeotropic distillation whereby the water and oil are distilled from the mixture, and the oil is recycled until substantially all of the water has been removed. This method allows the use of the full volume of reactor for polymerization, since no addition materials are added once the reaction is complete. Plant operators have found that this method is ideal in reducing capital costs and minimizing the time for a complete cycle of polymer production.

Even though the industry has turned to this azeotropic distillation method, one serious drawback has been found which is becoming more and more important as various methods for utilizing the polymers have been developed. At the outset of the development of the use of water-soluble polymers, the efficiency of these polymers was so superior to prior art materials that relative activity of the polymers was of little concern. However, as the ultimate users of water-soluble polymers become more selective, those products which perform best in a given application are gaining the largest portion of that market. Accordingly, considerable effort has been expended to optimize the activity of polymers produced by the various polymerization methods.

It has recently been discovered that the azeotropic distillation step significantly reduces the activity of polymers. It is not unusual to find polymers possessing only 20% or less of their activity after distillation when compared to the activity of the freshly prepared polymer. While the exact reason for this loss of activity is not known with complete assurance, it is thought generally in the industry that activity is directly related to molecular weight. Distillation as set out above is believed to reduce molecular weight in some manner, thereby causing a lessening of activity.

In view of this finding that azeotropic distillation reduces the activity of water-soluble polymers, it would be of great advantage to the art if a method could be developed for maintaining polymer activity, or at least a major portion of their activity. Accordingly, it is a principal object of this invention to provide a method for azeotropic distillation of water from a mixture of a water-soluble polymer, water and an organic heat transfer medium.

Another object of this invention is to provide a process for maintaining the activity of water-soluble polymers during the azeotropic distillation step which does not involve the use of any additional reactor volume.

Other objects will become apparent to one skilled in the art upon the reading of the following detailed description of the invention.

In accordance with the invention, it has now been discovered that water may conveniently be removed from a mixture of a water-soluble polymer contained in a system having two liquid phases which comprise a water-insoluble heat transfer medium and water. A method of this invention comprises the addition of from about 50 p.p.m. to about 2000 p.p.m. of a salt of a metal selected from Groups I–B, II–B, VI–B, VII–B and VIII of the Periodic Table to the mixture and thereafter heating the mixture to drive off the water. These salts must necessarily be soluble in at least one of the two phases in order to be effective. It has been found that loss of activity of dehydrated polymers is substantially prevented by this process.

The polymers of a wide variety of well-known ethylenically unsaturated monomers may be processed according to the method described herein. Such monomers include acrylamide, methacrylamide, acrylic acid and methacrylic acid, as well as the water-soluble salts thereof, carboxyethylacrylate or salts thereof, acrylonitrile and methacrylonitrile, lower alkyl esters and alkyl ethers of acrylic acids, vinyl alkyl ethers, the polycarboxylic acids such as maleic, fumaric, itaconic, aconitic, citraconic, etc. which may be polymerized alone or copolymerized with the amides of these acids, the alkali metal derivatives (e.g. potassium, sodium and lithium) the alkaline earth metal derivatives (e.g. magnesium, calcium, barium and strontium) and ammonium salts of these acids and the like. Any of these monomers may be used alone or in combination with other monomers to achieve a polymer or copolymer which may be processed according to the process of this invention. The process described herein may thus be practiced using water-soluble polymers which are derived from a mixture of monomers, wherein a minor portion of these monomers are not water-soluble. Especially preferred for processing are polyacrylic acid polymers and salts thereof, polyacrylamide and copolymers of acrylamide and acrylic acid or salts thereof.

The particular water-insoluble organic heat transfer medium also may be selected from any number of suitable compounds. This medium may be any liquid organic compound which is substantially insoluble in water. Especially preferred are benzene, toluene, xylene, ethylene dichloride, carbon tetrachloride, tetrachloroethylene, perchloroethylene, heptane, hexane, mixed paraffinic fractions and mixtures thereof. Preferably, this medium should be capable of forming an azeotropic mixture with water.

The amount of water present in the system may vary from essentially no water, which occurs at the end of the distillation, to as much as 50% to 80% water. Again, this is dependent upon the particular polymerization process. The amounts of water and inorganic heat transfer medium, as well as the amount of polymer, have not been found to materially affect the operation of the process of this invention.

As mentioned above, the particular metals which are to be employed in the process of this invention are selected from Groups I–B, II–B, VI–B, VII–B and VIII of the Periodic Table. These metals necessarily must be added in salt form. The salt should be soluble in either the organic heat transfer medium or the water, or both. It has been found that the particular anion of the salt employed is immaterial and does not affect the efficiency of this invention. The anion may be inorganic, i.e. sulfate, sulfite, nitrate, nitrite, chloride, bromide, iodide, chromate, phosphate, carbonate, bicarbonate, etc., or any other anion which will form a water- and/or organic medium-soluble material. Organic salts such as stearates, maleates, formates, oleates, acetates, palmitates, oxalates, lactates, citrates, tartrates, and the like, are also suitable for use in the instant process, again provided that the salt be soluble in at least one of the two liquid phases. Particularly preferred materials falling within the above class of compounds are copper, nickel, cobalt and silver. The copper, nickel and cobalt are in the +2 valence state, while silver is preferably in the +1 valence state. The amount of the metal which must be added to effectively maintain the activity of the water-soluble polymer during the distillation may range from about 50 p.p.m. to as high as 2000 p.p.m. or higher, based on the polymer solids. A preferred range to be employed in the process of this invention is from about 100 p.p.m. to about 1000 p.p.m.

To illustrate various embodiments of the invention, the following examples are presented by way of illustration. These examples are merely intended to be illustrative, and are not to be construed as limiting upon the scope of the claims appended herein.

EXAMPLES

To demonstrate the efficiency of the process of this invention, a number of experiments were performed. Basically, the procedure was as follows. First, a water-soluble polymer was prepared by polymerizing a water-soluble polymer in a two-phase system comprising water and toluene. Once the monomer was prepared, a distillation step was used to remove the water from the polymer mixture. The activity of the polymer prior to and after the distillation step was measured to determine the effect of that step on the polymer characteristics.

In this instance, the particular polymer prepared was a polysodiumacrylate polymer. A 39% solution of sodium acrylate in water was mixed with toluene in a 2:1 ratio of toluene to monomer solution. 2%, based on the toluene, of sorbitan monooleate was added as an emulsifier. Azobisisobutyronitrile was employed as a catalyst. After sufficient time had elapsed to effect essentially 100% conversion of monomer, a sample of the polymer was withdrawn from the reactor and the activity of this polymer was measured. At this time, the polymerized system was then heated to distill off the water by azeotropic distillation. The toluene was collected and recycled to maintain sufficient reactor volume. Upon completion of the removal of the originally present water, the activity of the polymer was again measured. This procedure was repeated a number of times using various additives employed to maintain the polymer activity. The results of these tests are presented below in Table I.

TABLE I.—EFFECT OF DISTILLATION ON POLYMER ACTIVITY

| Run No. | Additive to maintain activity | Brookfield viscosity of 0.5% polymer dissolved in aqueous 0.5 N sodium chloride (cps.) |
| --- | --- | --- |
| A | None | 85 |
| B | 10,000 p.p.m. hydroquinone | 105 |
| C | 10,000 p.p.m. hydroxylamine hydrochloride | 38 |

The activity of the various polymers recorded in Table I was determined by a measurement of the viscosity of the polymer dissolved in water. While it is admitted that true molecular weight can best be determined by elaborate scientific techniques such as the method known as light scattering, it is well-known that the viscosities of any particular polymer in a standard solution will give excellent indications of the relative molecular weight of each particular polymer, provided that the viscosity measurement is the same in each case. For the purposes of this invention, the viscosity was measured using a Brookfield Viscometer. In each case, sufficient polymer was dissolved in a 0.5 normal aqueous solution of sodium chloride to give a 0.5% by weight solution of the water-soluble polymer. This particular standard for viscosity measurement was arbitrarily chosen in order to set up some valid method for comparing the various polymers. Other methods for measuring the activity of water-soluble polymers are equally valid and have been found to demonstrate with equal force the surprising effectiveness of the process of this invention.

The results of the various experiments, shown above in Table I, clearly demonstrate the efficiency of the process of this invention. In each case, an identical polymerization procedure was followed. The resulting polymers, prior to distillation, were found to have a Brookfield viscosity measured as outlined above of approximately 500 to 600 cps. Run A of Table I represents a distillation with no attempt to preserve activity. Run B shows the effect of the addition of 10,000 p.p.m., based on the polymer, of a known chainstopper, namely hydroquinone. Run C also demonstrates the effect of another known chainstopping agent employed at a 10,000 p.p.m. addition level, namely hydroxylamine hydrochloride. As is evident, neither of these additives were able to prevent significant loss of activity in the polymer. The remaining runs presented in Table II demonstrates the effectiveness of various metals used in the process of this invention. As is readily apparent, the activity of the polymer after distillation was substantially higher than any of the first three runs. These polymers also demonstrated superior activity in a wide variety of applications using these water-soluble polymers, such as in coagulating a large number of suspended solids.

TABLE II.—EFFECT OF METALS

| Run No. | Additive to maintain activity | Brookfield viscosity of 0.5% polymer dissolved in aqueous 0.5 N sodium chloride (cps.) |
|---|---|---|
| D | 500 p.p.m. copper [1] II | 390 |
| E | 100 p.p.m. copper [1] II | 385 |
| F | 500 pp.m. silver [2] I | 503 |
| G | 100 p.p.m. silver [2] I | 397 |
| H | 500 p.p.m. nickel [1] II | 445 |
| I | 100 p.p.m. nickel [1] II | 350 |
| J | 500 p.p.m. cobalt [1] II | 425 |
| K | 500 p.p.m. nickel [1] II | 485 |

[1] Added as sulfate salt.
[2] Added as nitrate salt.

Similar results were found using a wide variety of water-soluble polymers contained in a number of organic heat transfer mediums and water. These polymers, when subjected to distillation according to the process of this invention, demonstrated superior activity in the order of 4 to 10 times greater than similar polymers prepared without the protective benefit of the metals according to the process of this invention. These polymers were superior when used as coagulants, paper additives, coatings, adhesives and as other products and processes in which water-soluble polymers are normally employed.

"Activity," as used herein, is defined as the ability of the polymer to perform its function when used in a process or as a product where water-soluble polymers are employed. Higher activity means that the polymer is more able to so perform the function.

Obviously, many modifications and variations of the invention as herein set forth may be made without departing from the spirit and scope thereof, and therefore only such limitations should be imposed as are indicated in the appended claims.

What is claimed is:
1. An azeotropic distillation process of removing water from a mixture of a water-soluble polymer selected from the group consisting of polyacrylic acid and salts thereof and copolymers of acrylic acid and salts thereof contained in a system having two liquid phases comprising an organic water-insoluble heat transfer medium and water which comprises: adding to said mixture from 50 p.p.m. to 2000 p.p.m. based on the polymer of a salt of a metal selected from a group consisting of groups I-B, II-B, VI-B, VII-B and VIII of the Periodic Table, said salt being characterized as being soluble in at least one of the two liquid phases, and thereafter heating said mixture to drive off said water, whereby the presence of said metal prevents loss of polymer activity during said heating step.

2. The process of claim 1 wherein said mixture is formed during preparation of said water-soluble polymer.

3. An azeotropic distillation process of removing water from a mixture of a water-soluble polymer selected from the group consisting of polyacrylic acid and salts thereof and copolymers of acrylic acid and salts thereof contained in a system having two liquid phases comprising an organic water-insoluble heat transfer medium and water which comprises: adding to said mixture from 50 p.p.m. to 2000 p.p.m. based on the polymer of a salt of a metal selected from the group consisting of copper (II), nickel (II), cobalt (II) and silver (I), where said Roman numeral refers to the valence state of said metal, said salt being characterized as being soluble in at least one of the two liquid phases, and thereafter heating said mixture to drive off said water, whereby the presence of said metal prevents loss of polymer activity during said heating step, said activity being determined by measuring of the viscosity of 0.5% by weight of said polymer dissolved in an aqueous 0.5 normal solution of sodium chloride.

4. The process of claim 3 wherein said mixture is formed during preparation of said water-soluble polymer.

5. The process of claim 3 wherein from 100 p.p.m. to 1000 p.p.m. of said metal is added.

References Cited

UNITED STATES PATENTS

| 2,990,381 | 6/1961 | Meinel | 260—2.5 |
| 3,097,097 | 7/1963 | Oster et al. | 96—35 |
| 3,251,814 | 5/1966 | Gentile | 260—80.3 |
| 3,336,270 | 8/1967 | Monagle | 260—79.3 |
| 3,380,947 | 4/1968 | Galgoczi | 260—29.6 |
| 3,278,506 | 10/1966 | Chamot et al. | 260—89.7 |

JOSEPH L. SCHOFER, Primary Examiner

S. M. LEVIN, Assistant Examiner

U.S. Cl. X.R.

260—78.4, 78.5, 80.3, 80.6, 88.7, 89.3, 89.7, 91.1, 96

PO-1050
(5/69)

UNITED STATES PATENT OFFICE
CERTIFICATE OF CORRECTION

Patent No. 3,507,840          Dated April 21, 1970

Inventor(s) John R. Hurlock

It is certified that error appears in the above-identified patent and that said Letters Patent are hereby corrected as shown below:

Column 4, line 3, "polymer" should read -- monomer --;
line 4, "monomer" should read -- polymer --.

SIGNED AND
SEALED

SEP 29 1970

(SEAL)
Attest:

Edward M. Fletcher, Jr.
Attesting Officer

WILLIAM E. SCHUYLER, JR.
Commissioner of Patents